Patented Jan. 2, 1945

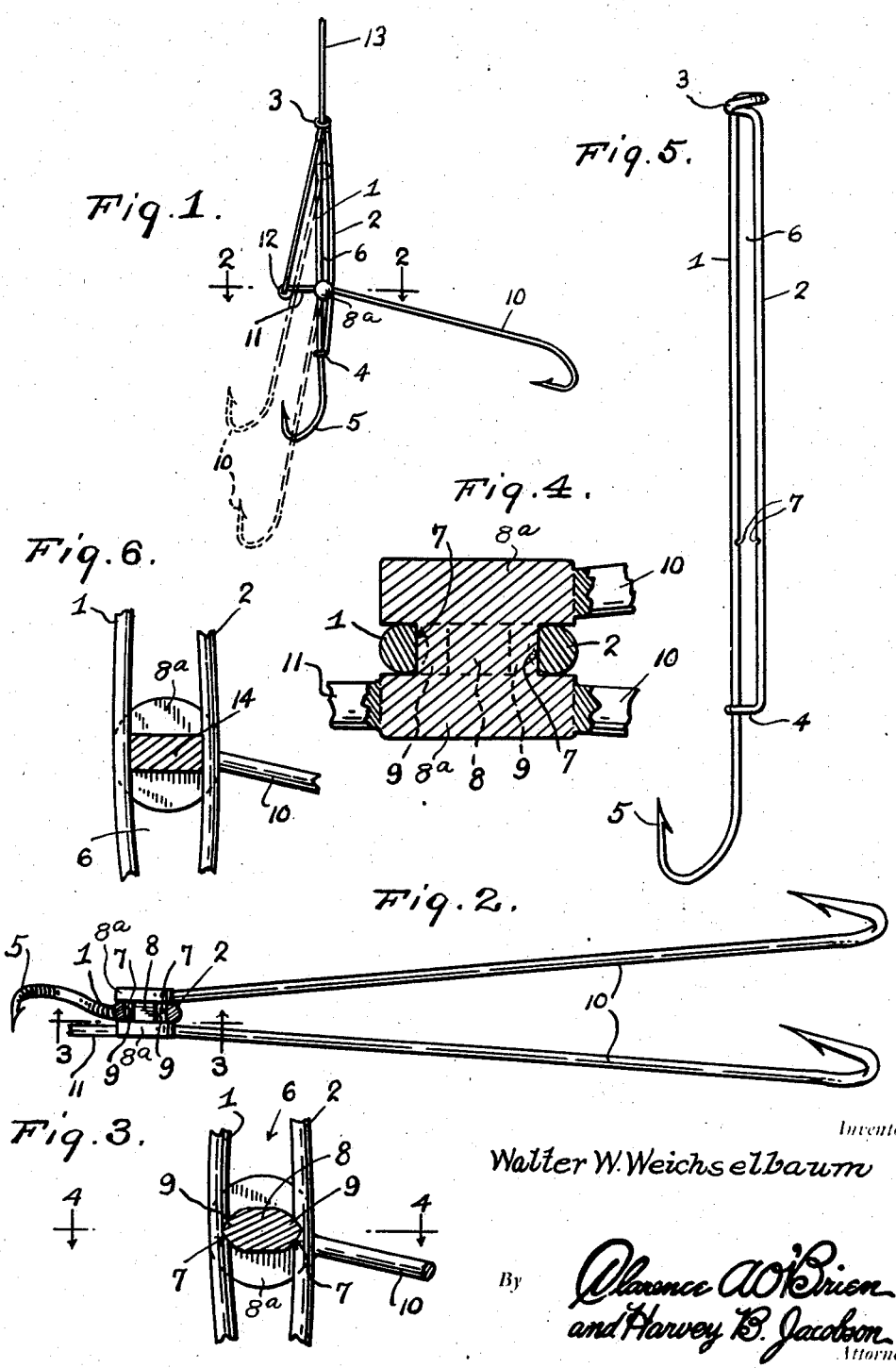

2,366,662

UNITED STATES PATENT OFFICE 2,366,662

FISHHOOK

Walter W. Weichselbaum, Gemmell, Minn.

Application July 3, 1943, Serial No. 493,445

4 Claims. (Cl. 43—37)

The present invention relates to new and useful improvements in fish hooks of the trap type and has for its primary object to provide, in a manner as hereinafter set forth, a device of this character comprising bait and gaff hooks embodying a novel construction and arrangement for automatically and with certainty catching and holding the fish when it takes the bait from any position and pulls on the bait hook, or when the line is pulled.

Another very important object of the invention is to provide an automatic pull actuated trap hook of the character described wherein the gaff hooks will engage the fish beneath the mouth, which is the most effective point, and wherein, further, said gaff hooks will adjust themselves to properly engage the fish regardless of the position of said fish relative to the bait hook.

Still another very important object of the invention is to provide a fish hook of the aforementioned character which embodies unique means for releasably securing the gaff hooks in retracted or inoperative position.

Other objects of the invention are to provide a fish hook of the character set forth which will be comparatively simple in construction, strong, durable, highly efficient and reliable in use, compact, and which may be manufactured at low cost.

All of the foregoing and still further objects and advantages of the invention will become apparent from a study of the following specification, taken in connection with the accompanying drawing wherein like characters of reference designate corresponding parts throughout the several views, and wherein:

Figure 1 is a view in side elevation of a fish hook constructed in accordance with the present invention.

Figure 2 is a view in horizontal section through the device, taken substantially on the line 2—2 of Figure 1.

Figure 3 is a detail view in vertical section, taken substantially on the line 3—3 of Figure 2.

Figure 4 is an enlarged view in horizontal section, taken substantially on the line 4—4 of Figure 3.

Figure 5 is a view in side elevation of the bait hook and the elements which are integral therewith.

Figure 6 is a fragmentary view in vertical section through a modification.

Referring now to the drawing in detail, it will be seen that reference numerals 1 and 2 designate a pair of spaced, parallel rods of suitable metal. The rods 1 and 2 are connected at one end by a coil constituting a line guide 3. At its other end, the rod 2 is connected by a laterally projecting loop 4 to the corresponding end portion of the rod 1. Projecting from this end of the rod 1 is an integral bait hook 5.

In the embodiment shown, the elements 1 to 5, inclusive, are formed from a single length of suitable material. The spaced, parallel rods 1 and 2 define an elongated opening or slot 6. At an intermediate point, the rods 1 and 2 have formed therein opposed notches 7, the purpose of which will be presently set forth.

As illustrated to advantage in Figure 3 of the drawing, a cam 8, having disk-like heads 8a on the sides thereof, is slidably and swingably mounted in the slot 6, between the rods 1 and 2. The cam 8 includes substantially tapered ends 9 which are engageable in the notches 7. Diverging gaff hooks 10 are fixed, at one end, on the heads of the cam 8.

It will be observed that the gaff hooks 10 are thus mounted for sliding and swinging movement between the rods 1 and 2. Projecting from one head of cam 8 is a lever or arm 11 having an eye 12 on its free end. The line 13 passes slidably through the guide 3 and is connected to the eye 12, thus operatively connecting said line to the gaff hooks 10.

It is thought that the operation of the device will be readily apparent from a consideration of the foregoing. Briefly, the hook 5 is baited and the gaff hooks 10 are swung to the full line position of Figures 1 and 3 of the drawing. When this occurs, the cam 8 spreads and tensions the rods 1 and 2 and the end portions 9 of said cam seat in the notches 7 for holding the gaff hooks 10 in retracted or inoperative position. With the gaff hooks 10 in this position, it will be observed that the lever 11 extends substantially at right angles from the rods 1 and 2. Now, when a fish pulls on the bait hook 5 from any position, or when the line 13 is pulled, the gaff hooks 10 are swung through the medium of the lever 11 toward the lower dotted line position of Figure 1. As the gaff hooks 10 are thus actuated, the cam 8 is rotated and the end portions 9 thereof are disengaged from the notches 7. The resilient, outwardly bowed rods 1 and 2, which are still under tension, now accelerate the swinging movement of the cam 8 for imparting what may be considered a snap action to said gaff hooks 10 in their swing into engagement with the fish. During this operation, the gaff hooks 10, when making contact with the fish, also move longitudinally on the rods 1 and 2 substantially toward the upper dotted line postion of Figure 1 for automatically adjusting themselves for properly engaging the fish beneath the mouth.

In the modification illustrated in Figure 6 of the drawing, the notches 7 are omitted and a cam 14 of substantially rectangular cross section is rotatably and slidably engaged between the rods 1 and 2 in lieu of the cam 8. The construction of the cam 14 is such that it will not slide longitudinally between the rods 1 and 2 until the gaff hooks 10 approach the limit of their forward swing. In other respects this embodiment of the device is substantially similar in construction and operation to the form illustrated in Figures 1 to 5, inclusive, of the drawing.

It is believed that the many advantages of a fish hook constructed in accordance with the present invention will be readily understood, and although preferred embodiments of the device are as illustrated and described, it is to be understood that further modifications and changes of the details of construction may be resorted to which will fall within the scope of the invention as claimed.

What is claimed is:

1. A fish hook comprising a pair of resilient rods, means connecting said rods in spaced substantially parallel relation, a bait hook on one end of one of said rods, gaff hooks having corresponding ends rigidly connected together and swingably and slidably mounted between the rods, an arm fixed to the rigidly connected ends of the gaff hooks, a guide on the rods, and a line extending slidably through the guide and connected to the arm for actuating the gaff hooks.

2. A fish hook of the character described comprising a pair of spaced, parallel resilient rods, a bait hook on one of the rods, a guide on the rods for slidably receiving a line, a cam swingably and slidably mounted between the rods and engageable therewith for tensioning said rods so that the latter engage and retain said cam against sliding movement between said rods, gaff hooks fixed to the cam at corresponding ends, and an arm fixed to the cam for connection with the line for actuating said gaff hooks.

3. A fish hook of the character described comprising a pair of spaced, parallel resilient rods defining an elongated slot, an integral guide connecting the rods at one end, for slidably accommodating a line, means connecting the other end portions of the rods, a bait hook on one of the rods, said rods having opposed notches therein, a cam swingable and slidable in the slot and engageable in the notches for tensioning the rods and for releasably securing said cam against sliding movement therebetween, gaff hooks having one end portion fixed to the cam, and an arm on said cam for connection with the line for actuating said gaff hooks.

4. A fish hook of the character described comprising a pair of spaced, parallel, resilient rods defining an elongated slot, a guide on the rods for slidably receiving a line, a bait hook on one of the rods, a cam of substantially rectangular cross section swingable and slidable in the slot and engageable with the rods for tensioning said rods for frictionally securing said cam against sliding movement therebetween, gaff hooks fixed at one end to the cam, and an arm fixed to said cam for connection with the line for actuation thereby for actuating said gaff hooks.

WALTER W. WEICHSELBAUM.